United States Patent
Friedrich (10) Patent No.: US 10,323,379 B2
(45) Date of Patent: Jun. 18, 2019

(54) QUICK COUPLER WITH INDEPENDENT LOCKING ELEMENT AND SECURING ELEMENT

(71) Applicant: Kinshofer GmbH, Waakirchen (DE)

(72) Inventor: Thomas Friedrich, Schliersee (DE)

(73) Assignee: KINSHOFER GMBH, Waakirchen (DE)

(*) Notice: Subject to any disclaimer, the term of this patent is extended or adjusted under 35 U.S.C. 154(b) by 0 days.

(21) Appl. No.: 15/640,693

(22) Filed: Jul. 3, 2017

(65) Prior Publication Data

US 2018/0010318 A1    Jan. 11, 2018

(30) Foreign Application Priority Data

Jul. 5, 2016 (DE) .................... 20 2016 004 202 U (51) Int. Cl.
  *E02F 3/36* (2006.01)
  *E02F 3/32* (2006.01)
  *A01B 59/06* (2006.01)

(52) U.S. Cl.
  CPC ............ *E02F 3/3622* (2013.01); *E02F 3/365* (2013.01); *E02F 3/3627* (2013.01); *E02F 3/3659* (2013.01); *E02F 3/3663* (2013.01); *A01B 59/06* (2013.01); *A01B 59/064* (2013.01); *E02F 3/32* (2013.01)

(58) Field of Classification Search
  CPC ..... E02F 3/3659; E02F 3/3663; E02F 3/3618; E02F 3/3654; E02F 3/364
  See application file for complete search history.

(56) References Cited

U.S. PATENT DOCUMENTS

| 5,049,027 A | 9/1991 | Morrison et al. |
| 6,058,633 A * | 5/2000 | Barden ................. E02F 3/3618 37/468 |
| 7,047,866 B2 * | 5/2006 | Fatemi .................... E02F 3/365 91/1 |
| 8,622,645 B2 | 1/2014 | Hill |

(Continued)

FOREIGN PATENT DOCUMENTS

| AT | 513586 A2 | 5/2014 |
| DE | 20012390 U1 | 11/2000 |

(Continued)

OTHER PUBLICATIONS

Search Report issued by the German Patent and Trade Mark Office (DPMA) for related German Patent Application No. 202016004202.6 dated Jun. 1, 2017.

*Primary Examiner* — Gerald McClain
(74) *Attorney, Agent, or Firm* — Troutman Sanders LLP; Ryan Schneider (57) ABSTRACT

A quick coupler for coupling a tool such as an excavator bucket, a clamshell grapple or demolition shears to a tool operator such as an excavator arm or the like. The quick coupler including a coupling mount for receiving a first locking part and a locking mount for receiving a second locking part, wherein a locking element for locking the second locking part in the locking mount is at least associated with the locking mount, with the locking element being actuable by an adjustment actuator. The quick coupler can be electrically controllable, with the quick coupler having an electric drive for actuating the adjustment actuator for the locking element.

21 Claims, 11 Drawing Sheets

(56) References Cited

U.S. PATENT DOCUMENTS

| | | | |
|---|---|---|---|
| 2005/0000122 A1* | 1/2005 | Chagnot | ............... E02F 3/205 37/352 |
| 2011/0091267 A1 | 4/2011 | Hill | |
| 2018/0230667 A1* | 8/2018 | Coudry | ............... E02F 3/3654 |

FOREIGN PATENT DOCUMENTS

| | | |
|---|---|---|
| DE | 202014001328 U1 | 6/2015 |
| EP | 1852555 A2 | 11/2007 |
| JP | 20101333142 A | 6/2010 |
| WO | 2008138932 A2 | 11/2008 |

* cited by examiner

QUICK COUPLER WITH INDEPENDENT LOCKING ELEMENT AND SECURING ELEMENT

CROSS-REFERENCE TO RELATED APPLICATIONS

This application claims the benefit of German Utility Model Application No. 20 2016 004 202.6 filed 5 Jul. 2017, the entire contents and substance of which is hereby incorporated by reference.

BACKGROUND OF THE INVENTION

1. Field of Invention

The present invention relates to a quick coupler for coupling a tool such as an excavator bucket, a clamshell grapple or demolition shears to a tool operator such as an excavator arm or the like, comprising a coupling mount for receiving a first locking part and a locking mount for receiving a second locking part, wherein a locking element for locking the second locking part in the locking mount is at least associated with the locking mount, with the locking element being actuable by an adjustment actuator.

2. Background and Related Art

Quick couplers are frequently used with construction machines such as hydraulic excavators or articulated grippers such as wood handling machines or demolition units or similar material transfer machinery for coupling different tools such as rakers, clamshell grapples or demolition shears to an excavator arm or similar tool operators such as articulated arm booms in order to be able to use different tools without long changeover times.

Such quick couplers can in particular have two mutually spaced apart locking axles as locking elements at a coupling part, whereas the other coupling part, in particular the coupling part at the excavator arm side, can have a preferably hook-shaped coupling mount for hooking at a first one of the two locking axles and a locking mount for locking at the second locking axle. After hooking the first locking axle in the coupling mount, the two coupling parts can be pivoted with respect to one another, wherein the locking axle seated in the coupling mount forms the pivot axle so that the second locking axle moves or is pivoted into the locking mount where the second locking axle can then be locked by a locking element such as an extendable wedge so that it is simultaneously also no longer possible to move the first locking axle out of the coupling mount. An adjustment actuator that is actuated by outside energy and that can, for example, be configured as a hydraulic cylinder and can typically be actuated by hydraulic pressure from the unit is provided to move the locking element.

The locking axles at the one coupling part can in this respect be formed by locking pins which can extend at the corresponding coupling part, in particular in parallel with one another, with optionally instead of such pins also other structural parts of the coupling part such as projecting noses, axle pivots, engagement stubs in the form of projections or recesses, for example in the form of pockets, being able to serve as the locking part, however, and being shape-matched to the coupling mount or to the locking mount of the other coupling part.

It has already been proposed for the prevention of the first locking axle from being released from the coupling mount again on the pivot process after the hooking of the first locking axle into the coupling mount also to associate a securing element, for example in the form of a spring-loaded snap-in wedge, to the coupling mount, with the snap-in wedge capturing the locking axle on the hooking of the locking axle into the coupling mount and securing it in the coupling mount. On the moving of the locking axle into the coupling mount, the securing snap lock is pressed back until the completely hooked-in position is reached so that the securing snap lock can snap back again and can block the exit path from the coupling mount. To be able also to move the first locking axle or to unhook it from the coupling mount on the removal of a tool after the unlocking of the locking mount, this securing element can be released again by a further adjustment actuator or can be moved into its releasing position again. This can take place with pressure medium actuation, for example by a simply acting pressure medium cylinder which can move the securing element back into the releasing position against its spring pre-loading into the locking or blocking position. A climbing down of the machine operator or a manual actuation can hereby be avoided.

To be able to actuate the locking and securing elements independently, it is possible to work with mutually decoupled, separate pressure circuits for the actuation of the locking mechanism and the unlocking of the securing element at the coupling mount, which EP 1 852 555 A2 shows, for example. In this respect, however, three pressure lines are as a rule required that are led along the excavator arm to the quick coupler, which in particular requires a corresponding, very expensive retrofitting with older units.

Since in practice in the past quick couplers of the named type, which were sold in large volumes and which are still in use today, were/are not provided with such an additional securing element at the coupling mount, it would be desirable not only to provide such an additional securing means at the coupling mount with new devices, i.e. new quick couplers, but also to be able to retrofit them to old quick couplers. The solution shown in EP 1 852 555 A2 is admittedly generally also suitable for retrofitting already existing quick couplers, but it requires three hydraulic connections due to the separate pressure circuit for actuating the securing element of the coupling mount, namely two connections for actuating the actual locking mechanism and a further pressure connection for unlocking the securing element of the coupling mount. In many cases, however, only two hydraulic connections are present at existing devices so that the retrofitting with such an additional security at the coupling mount is often not possible.

In order also to enable an additional security which is easy to actuate with only one pressure medium circuit and with a limited number of pressure medium connectors, it is proposed in DE 20 2012 007 124 U1 to connect the additional securing element via a pressure switch valve to the pressure circuit that is provided for the actuation of the main locking element. The pressure circuit can in this respect be ramped up to an increased pressure level by bypassing a pressure reducing valve, at which increased pressure level the pressure switch valve opens so that the additional security can be released against its spring pre-load. It is additionally proposed in DE 20 2014 001 328 U1 to use a dual-action cylinder instead of a single-action adjustment cylinder as the adjustment actuator in order hereby to avoid the spring pre-load of the securing element and also to be able to enforce a locking by hydraulic pressure even on difficult motion as a consequence, for example, of contamination.

DE 20 2012 007 124 and DE 20 2014 001 328 U1 admittedly avoid the problem of having to attach a third hydraulic line to the excavator arm; however, they require a sufficiently high hydraulic pressure from the excavator side or from the carrier unit side that is not always provided by the carrier unit or that requires corresponding interventions in the hydraulic system of the carrier unit. To be able to provide the required pressure, the pump at the carrier unit has to be pivoted outward sufficiently far, for which purpose the control of a different hydraulic function of the carrier unit is required at times, in particular when the quick coupler is retrofitted and was not yet taken into account in the original hydraulic control of the carrier unit. The bucket cylinder is, for example, traveled outwardly at times to have sufficient pressure for the actuation of the quick coupler and its locking element.

The issue that the hydraulic system at the carrier side at times only provides the pressure required for the quick coupler by special interventions relates per se not only to quick couplers in which both a securing element is associated with the coupling mount and a latching element is associated with the locking mount and the securing and locking elements have to be actuated after one another, but rather also applies to simpler quick couplers in which only one locking element has to be locked or unlocked.

Starting from this, it is the underlying object of the present invention to provide an improved quick coupler of the kind that avoids disadvantages of the prior art and further develops the latter in an advantageous manner. A simply designed lock should in particular be provided that can be actuated securely in the long term, that does not need any increased number of pressure medium connections and that also does not require any special demands and interventions at or in the hydraulic system.

BRIEF SUMMARY OF THE INVENTION

Briefly described, in a preferred form, the present invention comprises a quick coupler for coupling a tool to an excavator arm or the like of a carrier unit/tool operator, comprising a coupling mount for receiving a first locking part and a locking mount for receiving a second locking part, wherein a locking element for locking the second locking part in the locking mount is associated with at least the locking mount, and wherein the locking element is actuable by a locking element adjustment actuator, wherein the quick coupler is electrically controllable and actuable and has an electric drive for actuating the locking element adjustment actuator.

It is therefore proposed to configure the quick coupler such that it can be actuated independently of the hydraulic supply of the carrier unit and to be able to actuate the locking element for locking the locking mount and an optionally present securing element for the coupling mount without hydraulic pressure from the carrier unit. In accordance with the invention, the quick coupler is electrically controllable, with the quick coupler having an electric drive for actuating the locking element adjustment actuator for the locking element. Complex and/or expensive hydraulic installations at the excavator arm or at the tool operator can be dispensed with due to the electric control of the quick coupler and its drive system, nor are any interventions in the hydraulic system of the carrier unit necessary since the electric drive of the quick coupler works independently of the hydraulic system of the carrier unit.

The electric drive can advantageously be attached to or integrated in the quick coupler itself so that the quick coupler, including its drive, forms a separate independent assembly that can be attached to and dismantled from an excavator arm or a similar tool operator as a whole. It would, however, generally also be possible to attach the electric drive to the excavator arm or at another component disposed in the vicinity of the quick coupler and to connect it to the quick coupler. The electric drive can, however, be specifically provided for the quick coupler independently of its positioning without having to take over other tasks or having to drive units other than the quick coupler. The electric drive can form an assembly only provided for the quick coupler and can be provided only for the actuation of quick coupler functions.

For the energy supply of the electric drive, the quick coupler advantageously has a power connector, for example in the form of a power coupling, that can be connected to a power coupling at the carrier unit so that the electric drive of the quick coupler can be supplied with electrical energy from the carrier unit side. It would generally also be conceivable to provide a battery or a rechargeable battery from which the electric drive can be fed for the energy supply of the quick coupler. Such an electrical energy store can optionally also be provided in addition to the power connector or to the power coupling to be able to release the quick coupler on a failure of the power supply of the carrier unit.

The electric drive can in this respect be part of an electric/hydraulic hybrid system by means of which the at least one adjustment actuator of the quick coupler can be driven. The electric drive can in particular comprise a pump that is driven by an electric motor and provides pressure medium by means of which at least one adjustment actuator of the quick coupler can be actuated. The adjustment actuator is in this case then configured as a pressure medium actuator, in particular a hydraulic cylinder or a compressed air cylinder, but with other configurations of the pressure medium actuator also being able to be considered, for example in the form of a hydraulic motor.

Pressure, in particular hydraulic pressure, by means of which the adjustment actuator of the quick coupler can then be actuated can therefore be generated independently of the hydraulic pressure of the carrier unit at the quick coupler itself by means of the electric control of the quick coupler. The quick coupler can remain configured in a known manner with respect to its adjustment actuators per se due to the pressure medium actuation of the adjustment actuator and already existing quick couplers can in particular also be retrofitted. On the other hand, an independence from the hydraulic system of the carrier unit results due to the electric energy supply and the control of the quick coupler can be made easier. Ultimately only a corresponding electric switch at the driver's cabin of the carrier unit is required by means of which the energy supply of the electric drive at the quick coupler can be switched on and off or the drive can be electrically controlled.

Instead of such an autonomous pressure medium system at the quick coupler, the electric drive of the adjustment actuator of the quick coupler can, however, also be affected in another manner, which is without the conversion of the electric drive energy into pressure medium energy. For example, a mechanical conversion of the electric drive energy can take place, for example by means of a spindle drive that converts a drive movement of an electric motor into an adjustment movement of the adjustment actuator.

If a pump is provided at the quick coupler in the aforesaid manner, a tank can also be provided at the quick coupler that is in flow connection with the pump or that can be in flow connection via a valve arrangement. Such a tank at the quick coupler makes the pressure system at the quick coupler completely autonomous and independent of the pressure system of the carrier unit. The electrically driven pump of the quick coupler can suck in fluid from the tank and/or pressure fluid displaced from the adjustment actuator can flow back into the tank without the quick coupler requiring hydraulic connectors for connection to the tank of the carrier unit for this purpose.

A closed design of the pressure medium system at the quick coupler is generally also conceivable without such a tank, in particular when a dual-action pressure medium cylinder is used as the adjustment actuator, so that the pump or a corresponding pressure generator displaces the pressure medium to and fro only between the two pressure chambers of the pressure medium cylinder, that is it urges or conveys pressure medium out of the one pressure chamber into the other pressure chamber, whereby a corresponding adjustment movement of the pressure medium cylinder results. The provision of a tank, however, increases the design freedom of the system, in particular with respect to the pressure medium actuator. Single-action pressure medium cylinders can also hereby be used, for example, by means of which self-locking locking and/or securing elements can be opened, for example, in connection pre-loading devices and/or spring devices.

The electric drive, in particular its pump and a tank that may be present, can form a pre-installed assembly that can have fastening means for a retroactive attachment to a quick coupler in order also to be able to retrofit already existing quick couplers that were previously connected to the hydraulic system of the carrier unit. The electric drive, in particular its pump and a tank that may be present, can be configured as a retrofit kit in order also to electrically drive quick couplers previously hydraulically connected to the carrier unit and drive them autonomously, that is independently of the hydraulic system of the carrier unit.

Alternatively, the electric drive, including the pump, can, however, also be integrated in the quick coupler and/or can form a fixed component of the quick coupler.

The quick coupler can manage without hydraulic connectors. The quick coupler can in particular only have a power connector as the energy connector.

If the quick coupler has both a locking element for locking the locking mount and a securing element for catching and/or securing the locking part movable into the coupling mount, a common electric drive can be provided for the locking element and for the securing element, for example such that a pump that is provided at the quick coupler and that is electrically drivable provides pressure medium both for the locking element and for the securing element. It can be achieved in this respect by a suitable valve arrangement that the securing element and the locking element can be actuated independently from one another or after one another in time.

Alternatively, on the presence of a locking element and of a securing element, provision can also be made that a respective separate pump is associated with the two elements so that the locking element and the securing element can be actuated independently of one another by an electrical actuation of the respective pump.

In another exemplary embodiment, the present invention is a quick coupler for coupling a first tool of a tool operator to a second tool of the tool operator, the tool operator having a tool operator actuation system to actuate one or both of the first and second tools, the quick coupler comprising a quick coupler actuation system to operate a locking element of the quick coupler, the quick coupler actuation system being configured to be separate of and independent from the tool operator actuation system.

The quick coupler actuation system can comprise a pre-assembled assembly of an electric drive assembly and fastening means for retroactive attachment to a quick coupler body of the quick coupler to facilitate the quick coupler actuation system to be separate of and independent from the tool operator actuation system.

The quick coupler can further comprise a coupling mount for receiving a first locking part, a locking mount for receiving a second locking part, and the locking element for locking the second locking part in the locking mount, wherein the quick coupler actuation system comprises a locking element adjustment actuator for actuating the locking element, and a drive assembly for actuating the locking element adjustment actuator.

The drive assembly can comprises an electric drive assembly, and the tool operator actuation system can be a hydraulic system.

In another exemplary embodiment, the present invention is a quick coupler for coupling a tool to an excavator arm comprising a coupling mount for receiving a first locking part and a locking mount for receiving a second locking part, wherein a locking element for locking the second locking part in the locking mount is associated with at least the locking mount, and wherein the locking element is actuable by a locking element adjustment actuator, and wherein the quick coupler is electrically controllable and actuable and has an electric drive for actuating the locking element adjustment actuator.

The electric drive can have a pump that provides pressure medium to actuate the locking element adjustment actuator configured as a pressure medium actuator.

In another exemplary embodiment, the present invention is a quick coupler for coupling a first tool of a tool operator to a second tool of the tool operator, the quick coupler comprising a coupling mount for receiving a first locking part, a locking mount for receiving a second locking part, a locking element for locking the second locking part in the locking mount, a locking element adjustment actuator for actuating the locking element, and an electric drive assembly for actuating the locking element adjustment actuator.

The quick coupler can be an electrically controllable and actuable quick coupler, wherein at least one of the tools of the tool operator is actuated by a hydraulic system, and the electric drive assembly of the quick coupler can be separate of and independent from the hydraulic system of the excavator.

The tool operator can be an excavator, the first tool can be a tool, the second tool can an excavator arm, and the electric drive can comprise a pump that provides pressure medium to actuate the locking element adjustment actuator.

The quick coupler can further comprise a securing element for securing the first locking part in the coupling mount, and the tool operator can be an excavator, and one of the tools can be an excavator arm.

The electric drive can further comprise a tank in flow connection with the pump.

The locking element adjustment actuator can comprises a dual action pressure medium cylinder having two pressure chambers, and the pump can in flow connection to both pressure chambers of the pressure medium cylinder.

The quick coupler can further comprising a securing element adjustment actuator for actuating the securing element.

The securing element adjustment actuator can comprise a pressure medium actuator.

The electric drive can comprise a pump that provides pressure medium to actuate the securing element adjustment actuator.

The quick coupler can further comprise a securing element for securing the first locking part in the coupling mount, and a securing element adjustment actuator for actuating the securing element, wherein the electric drive actuates both the locking element adjustment actuator and the securing element adjustment actuator.

The electric drive can comprise a pump that provides pressure medium to actuate both the locking element adjustment actuator and the securing element adjustment.

These and other objects, features and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

In an exemplary embodiment, a quick coupler 1 for coupling a tool 4 to an excavator arm 5 or the like is provided, and comprises a coupling mount 6 for receiving a first locking part 13 and a locking mount 10 for receiving a second locking part 14, wherein a locking element 11 for locking the second locking part 14 in the locking mount 10 is associated with at least the locking mount 10, wherein the locking element 11 is actuable by a locking element adjustment actuator 12, wherein the quick coupler 1 is electrically controllable and actuable and has an electric drive 15 for actuating the adjustment actuator 12.

The electric drive 15 can have a pump 16 that provides pressure medium to actuate the adjustment actuator 12 configured as a pressure medium actuator.

A tank 19 can be included that is in flow connection with the pump 16 or is connectable flow-wise by a valve arrangement is provided at the fast coupler 1.

The adjustment actuator 12 can be configured as a dual action pressure medium cylinder and the pump 16 can be connected or is connectable via a valve arrangement to both pressure chambers of the pressure medium cylinder.

Preferably, the quick coupler 1 has only a power connector 18 as the energy connector.

The electric drive 15, in particular its pump 16 and an optionally present tank 19, can form a pre-assembled assembly that has fastening means for a retroactive attachment to a quick coupler body and for retrofitting a quick coupler with an electric drive.

The electric drive 15, in particular its pump 16 and an optionally present tank 19, can be integrated into a quick coupler base body and/or is a fixed component of the quick coupler 1.

A securing element 7 for catching and/or securing the first locking part 13 in the coupling mount 6 can be associated with the coupling mount 6, wherein the securing element 7 is actuable by a securing element adjustment actuator 8, and wherein the adjustment actuator 8 of the securing element 7 is actuable by the electric drive 15 or by a further electric drive 22.

The adjustment actuator 8 of the securing element 7 can be configured as a pressure medium actuator that can be acted on by pressure medium from the pump 16 of the electric drive 15 or from a further pump 24 that is provided at the quick coupler 1.

The electric drive 15 can be configured such that the locking element 11 and the securing element 7 can be actuated independently of one another and/or in a manner offset in time from one another.

Figure 1:
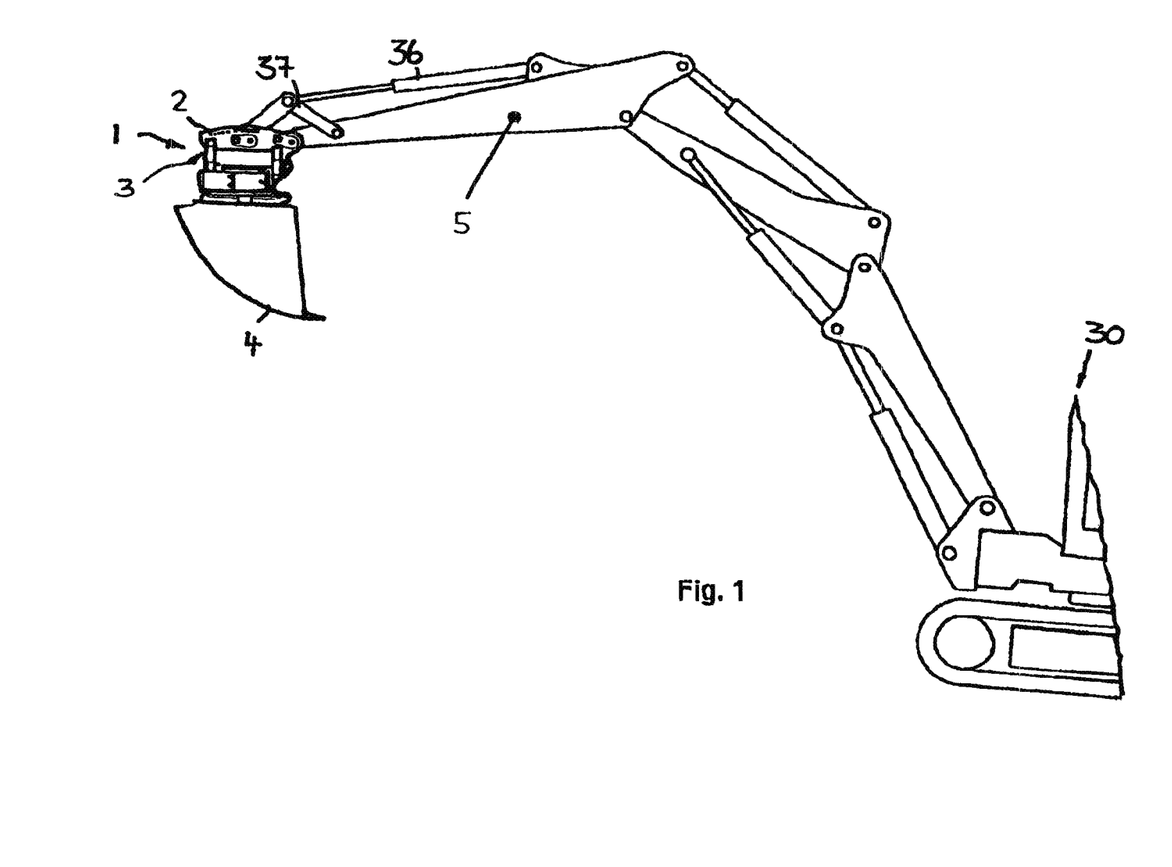
FIG. 1 is a schematic side view of a quick coupler in accordance with an advantageous embodiment of the invention which is attached to a boom arm of an excavator and couples an excavator bucket as an installation tool.

Now in reference to the figures, as FIG. 1 shows, the quick coupler 1 can be installed between the free end of the boom arm 5 of an excavator 30 and the tool 4 to be installed thereat, wherein the installation tool 4 is configured as an excavation bucket in FIG. 1, but which can naturally also comprise other corresponding construction tools, handling tools or demolition tools, for example in the form of clamshell grapples, demolition shears, shears or similar in a usual manner known per se. The quick coupler 1 is in this respect, on the one hand, able to be mounted to the boom arm 5 by means of a coupler part 2 at the arm side pivotable about a lying pivot axis aligned transversely to the longitudinal axis of the boom arm 5 so that the quick coupler 1 can be pivoted together with the tool 4 installed thereat, for example by means of a pressure medium cylinder 36 and an interposed pivot piece 37, with respect to the boom arm 5.

Figure 2:
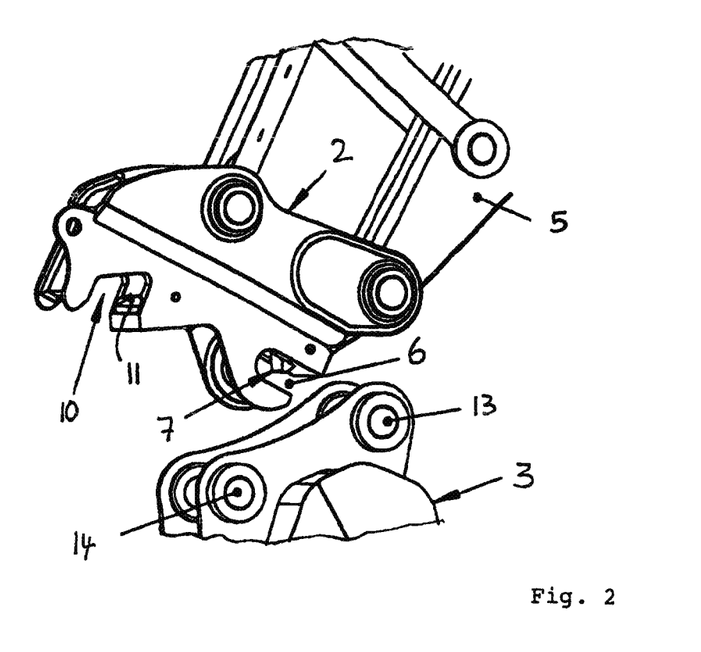
FIG. 2 is a perspective representation of the quick coupler of FIG. 1 in a decoupled position in which the two mutually couplable coupling parts are shown just before the hooking in at the hook section.

The quick coupler can, on the other hand, be installed by means of a tool-side coupler part 3—cf. FIG. 2—to the installation tool 4 and/or to an interposed rotational drive.

Figure 3:
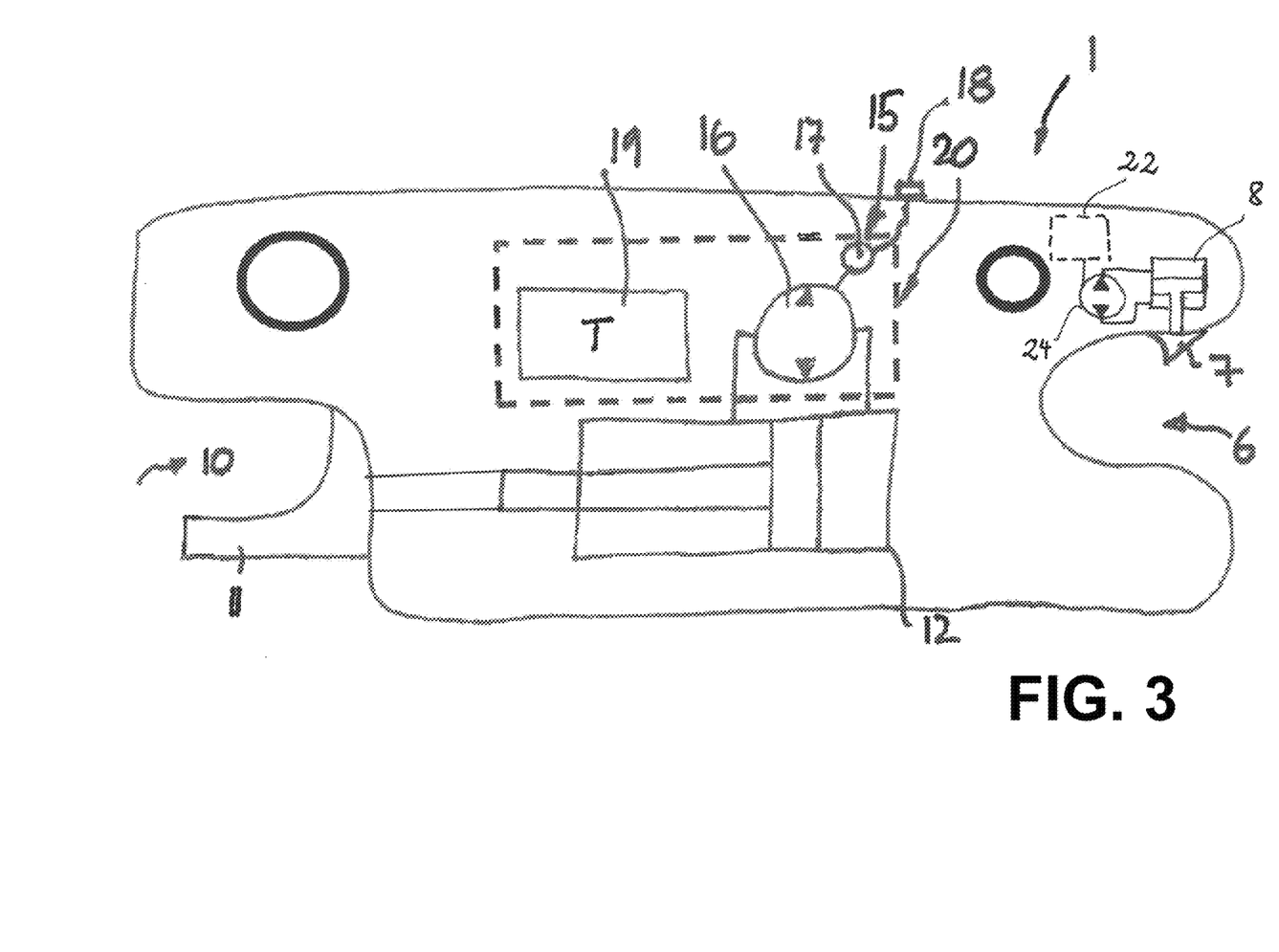
FIG. 3 is a schematic representation of the electric/hydraulic drive system of the quick coupler from the preceding Figures in accordance with an advantageous embodiment of the invention.
Figure 4:
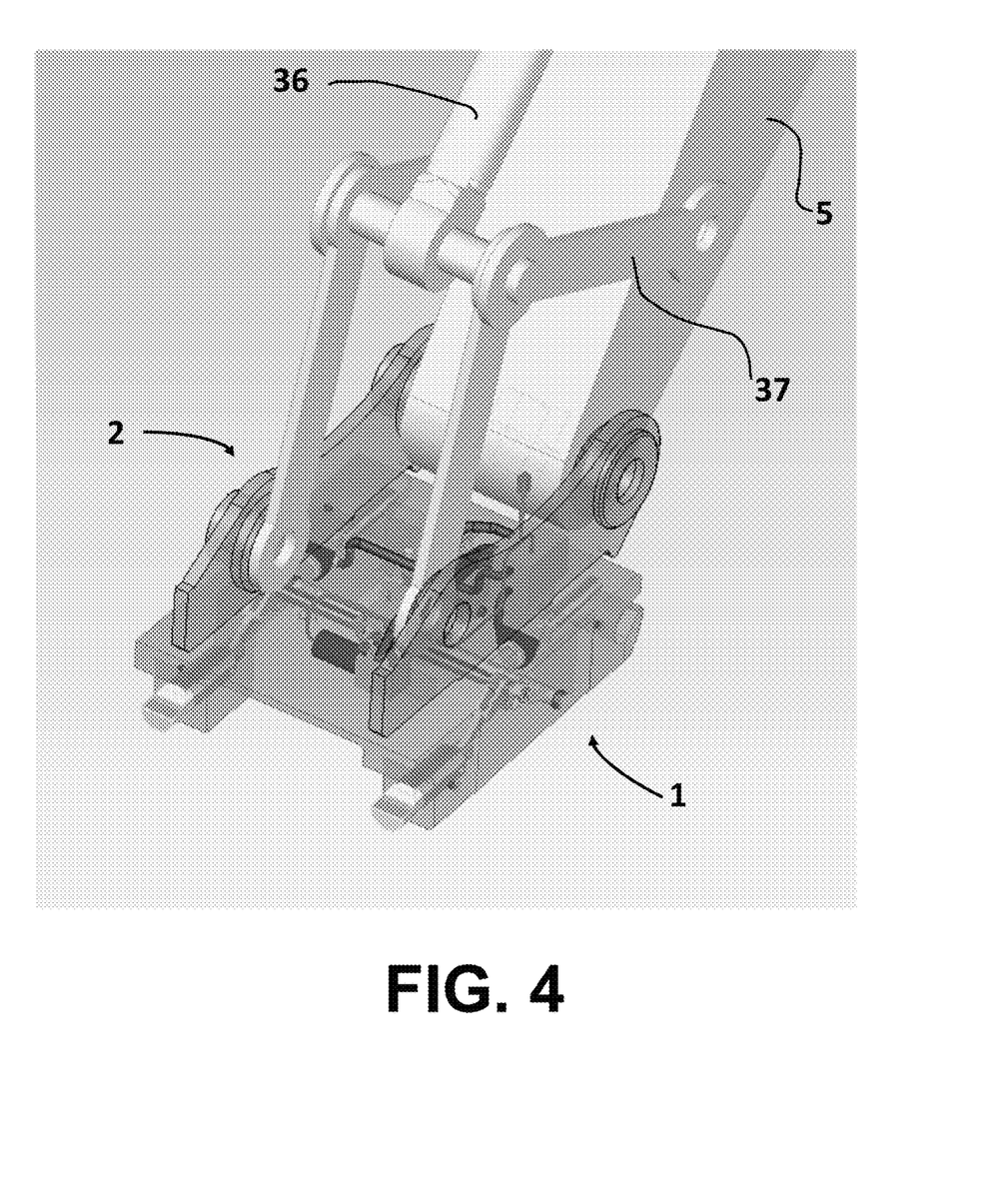
FIGS. 4-5 are perspective views of the quick coupler in accordance with an advantageous embodiment of the invention which is attached to the boom arm, and shows the electric drive of the electric drive assembly attached to or integrated in the quick coupler itself.
Figure 5:
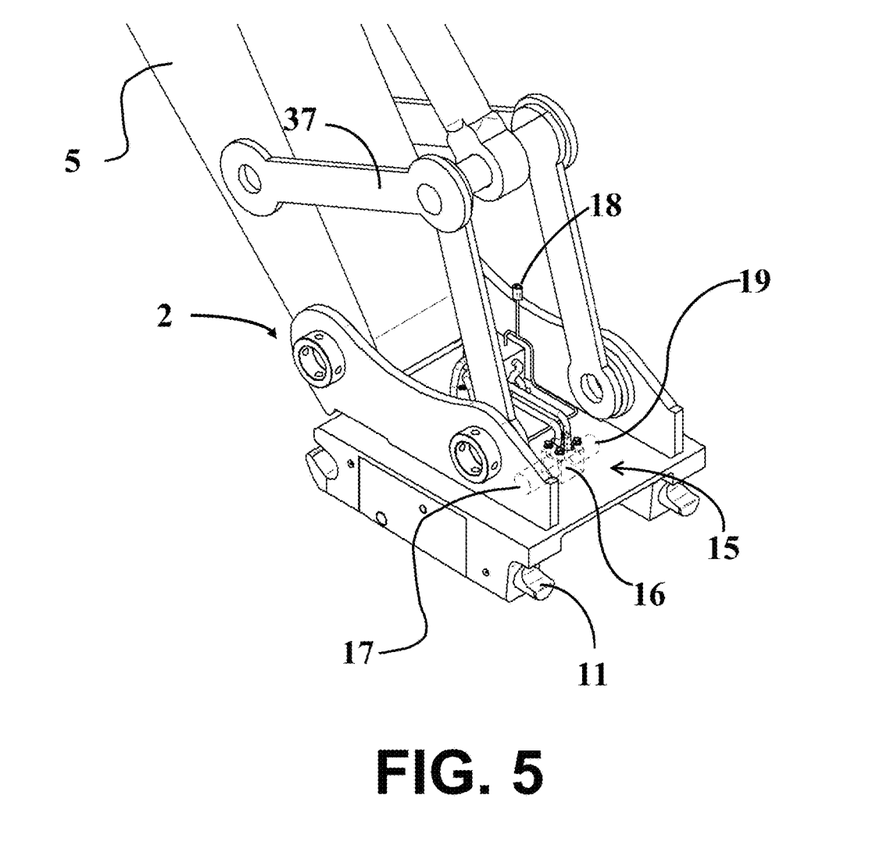
Figure 6:
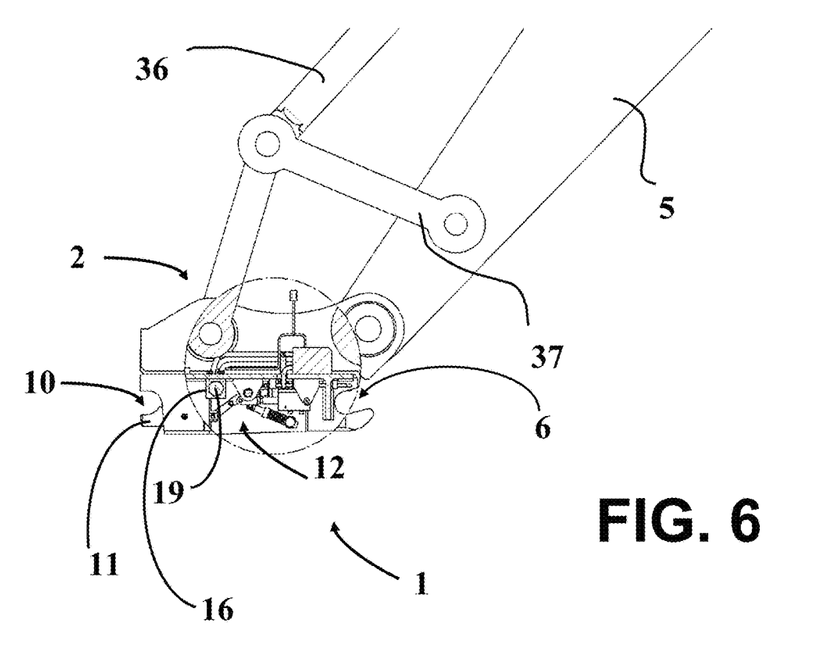
FIG. 6 is a side view of FIG. 5, with a cut-away view of an exemplary embodiment of the electric drive.
Figure 7:
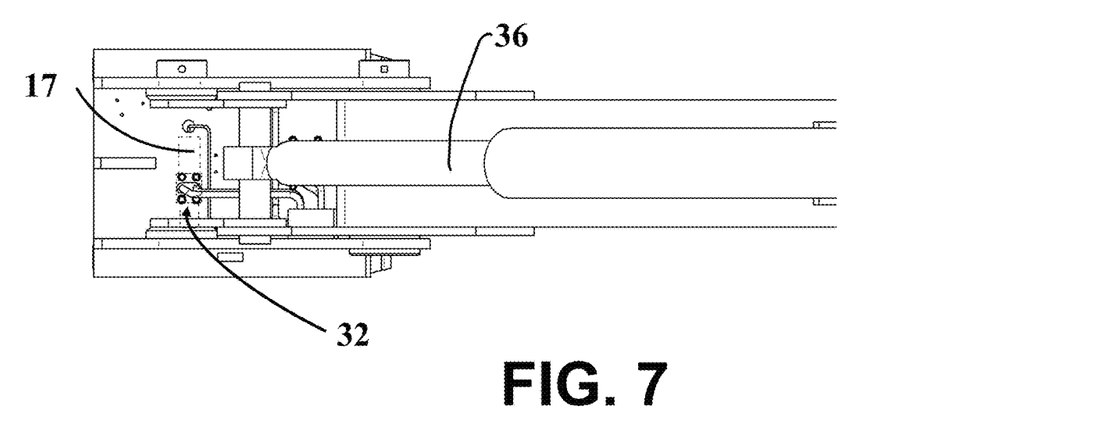
FIG. 7 is a top view of FIG. 5, illustrating an exemplary way that the drive unit is attached.
Figure 8:
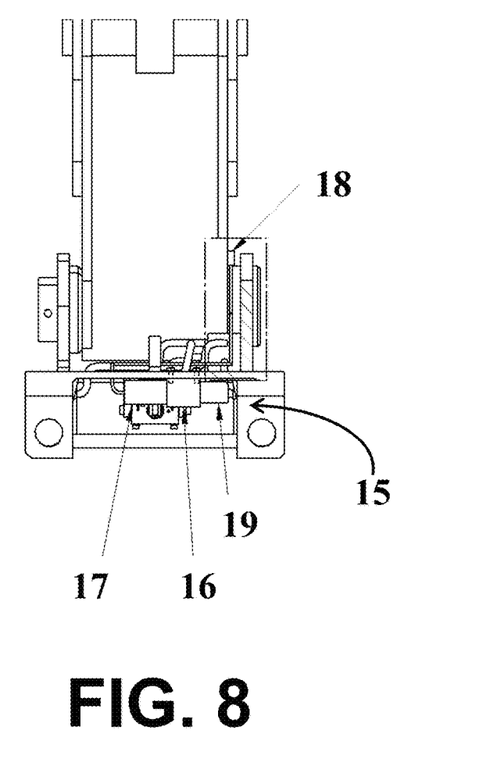
FIG. 8 is a front view of FIG. 5.
Figure 9:
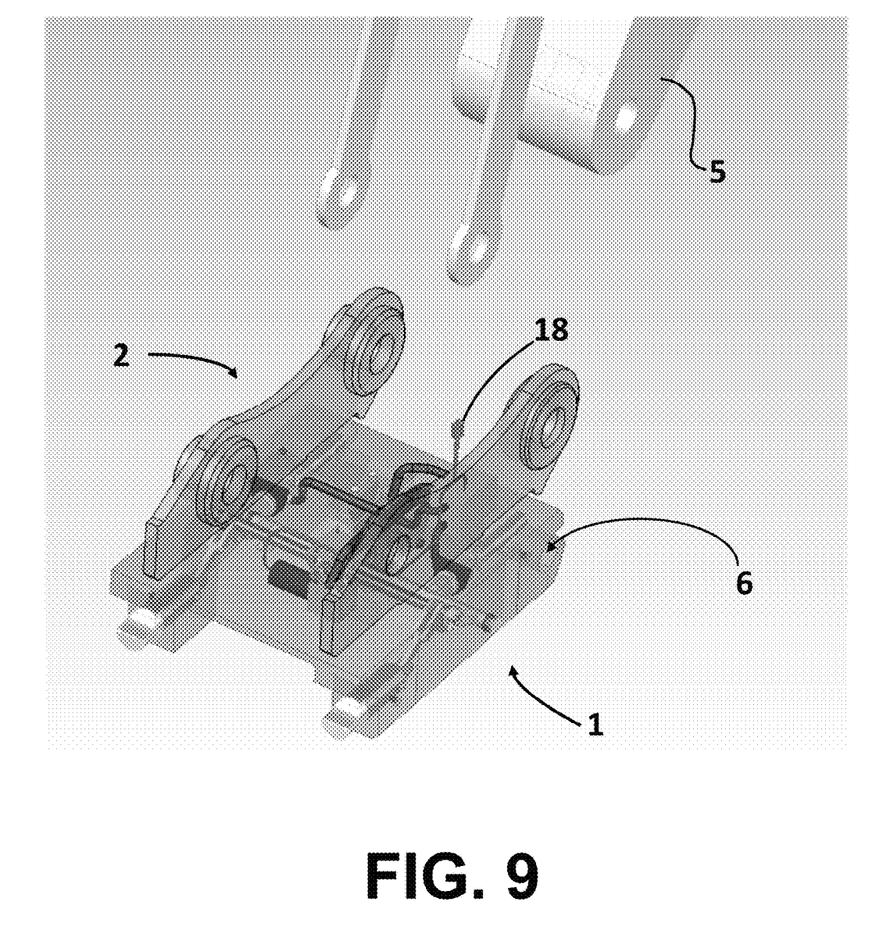
FIGS. 9-10 illustrate the quick coupler of FIG. 4 in a decoupled position (perspective view FIG. 9, and side view FIG. 10)
Figure 10:
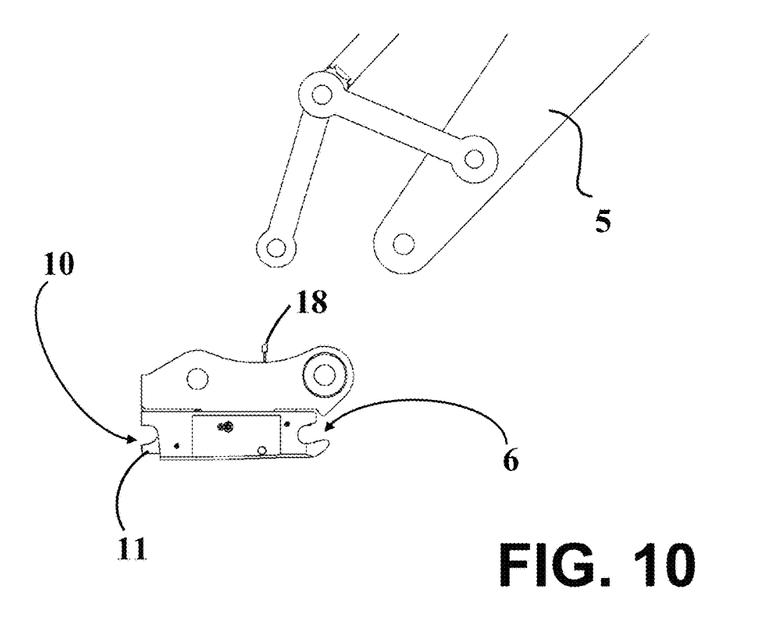
Figure 11:
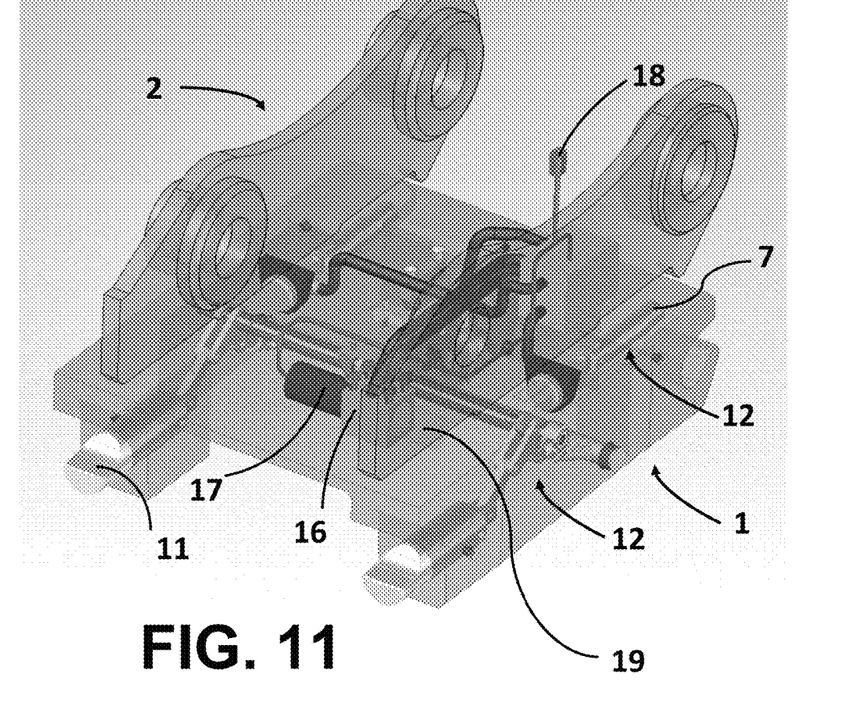
FIG. 11 is a perspective view of the quick coupler of FIG. 4 illustrated in greater detail.

As FIGS. 2 and 3 show, one of the two coupler parts 2 and 3 respectively, preferably the coupler part 2 at the arm side, can comprise a coupling mount 6, on the one hand, and a locking mount 10, on the other hand, which can be hooked in or brought into engagement with two locking parts, for example in the form of locking axles 13 and 14, at the other coupler part 3, preferably at the tool side. Contrary to the representation of the drawing, it would, however, generally also be possible to provide a locking axle and a mount at one coupler part and in turn to provide a locking axle and a mount at the other coupler part, with the embodiment shown with two mounts, i.e. a locking mount and a coupling mount at the one coupler part and two locking axles corresponding thereto at the other coupler part, being preferred, however, since the associated securing elements and locking elements and their actuation can then be combined at one coupler part.

As FIG. 2 shows, the coupling mount 6 and the locking mount 10 each form a mouth-shaped mount which is open toward a side and into which the locking axles 13 and 14 can move which can be formed by cross-pins or locking pints, cf. FIG. 2. In this respect, the coupling mount 6 and the locking mount 10 are advantageously arranged and configured such that when a first locking axle 13 of the one coupler part 3 has moved into or is hooked into the preferably hook-shaped coupling mount 6 of the other coupler part 2, the two coupler parts can be pivoted with respect to one another, and indeed such that the coupling mount 6 and the locking axle 13 received therein form the axis of rotation and the second locking axle 14 can move into the locking mount 10 by the corresponding pivot movement so that the two coupler parts 2 and 3 can be coupled to one another in a two-stage coupling process. The coupling mount 6 is first hooked at the first locking axle 13 so that then the locking mount 10 can be brought into engagement with the second locking axle 14 by pivoting the two coupler parts 2 and 3 relative to one another—which can take place, for example, by actuating the aforesaid pivot cylinder 36.

If the second locking axle 14 is moved into the locking mount 10, the second locking axle 14 is locked in the locking mount 10 or the locking mount 10 is closed so that the second locking axle 14 can no longer move out. For this purpose, a locking element 11 is provided, for example in the form of a locking wedge, which can be moved on the opening side of the locking mount 10 in front of the locking axle 14 received therein, cf. FIG. 3. To actuate the locking element 11, a hydraulically actuable locking element adjustment actuator 12 is advantageously provided in this respect which is connected directly or indirectly to the locking element 11 and is advantageously configured in dual action so that it can be moved forward and backward.

Not only the second locking axle 14 is in this respect held in the locking mount 10 by locking the locking element 11, but the two coupler parts 2 and 3 are also locked to one another since the coupling mount 6 is configured such that the first locking axle 13 received therein cannot move out of the coupling mount 6 when the second locking axle 14 is captured in the locking mount 10.

The coupling mount 6 nevertheless can have a securing element 7 associated with it by means of which the first locking axle 13 or a suitable locking part can be captured or can be secured or can be blocked in the coupling mount 6 so that the first locking axle 13 cannot unintentionally slip out of the coupling mount 6. Such an additional securing element could, however, generally be dispensed with. This securing element 7 primarily serves to prevent an unintentional sliding of the first locking axle 13 out of the coupling mount 6 during the aforesaid pivot movement on the coupling process as long as the two coupler parts 2 and 3 are still not locked to one another by closing the locking element 11.

The securing element 7 can likewise be a wedge-shaped slider or also, as FIG. 3 shows, a pivotably supported locking lever which tapers or blocks the opening of the coupling mount 6 so much in its locked position that the first locking axle 13 cannot slide out.

The securing element 7 can in this respect, for example, be hydraulically pre-loaded into the locking position to be urged back against the hydraulic pressure and/or while switching off the hydraulic pressure, advantageously automatically, on the moving of the first locking axle 13 into the coupling mount 6. If the locking axle 13 is moved completely or sufficiently far into the coupling mount 6, the securing element 7 can move into the locking position, driven by the pre-loading device, so that the locking axle 13 is captured.

To lock and release the securing element 7 for the purpose of the coupling and decoupling, a securing element adjustment actuator 8 is associated with the securing element 7 in this respect, for example in the form of a single-action or dual action or bidirectionally acting hydraulic cylinder by means of which the securing element 7 can be moved or pivoted into its releasing position and, optionally, also into its locking position.

To actuate the securing and locking elements 7 and 11, the quick coupler 1 comprises an electric drive system 20 via which the quick coupler 1 is electrically controllable so that it is independent of the hydraulic system of the carrier unit. The electric drive system 20 in this respect comprises an energy converter that converts electrical energy into pressure medium energy, in particular hydraulic energy, by means of which the adjustment actuators 8 and 12 can then be actuated.

Specifically, an electric drive 15 can be provided at the quick coupler 1 that can in particular have at least one pump 16 or another pressure generator that can be driven by an electric motor 17. For the control or for the energy supply of the electric drive 15, an electric coupling 18 can be provided at the quick coupler 1, for example in the form of an outlet or of another power connector, by means of which the electric drive system 20 can be connected to a power supply, in particular to an electrical energy supply of the carrier unit.

As FIG. 3 shows, the at least one pump 16 can be connected to a tank 19 or can be connectable thereto via a valve arrangement to be able to allow a suitable medium, in particular hydraulic oil, to be sucked in and/or to be able to allow pressure medium to flow back from the adjustment actuators 8 or 12.

As FIG. 3 further shows, the pump 16 can provide pressure medium by means of which the locking element adjustment actuator 12 and/or the securing element adjustment actuator 8 of the locking element 11 or of the securing element 7 respectively can be actuated. In general, both adjustment actuators 8 and 12 can be acted on by pressure fluid from the same pump 16, with here suitable valves, in particular switch valves and/or shut-off valves, being able to be provided to be able to space the actuation of the adjustment actuators 8 and 12 apart from one another in time. Such a valve arrangement for controlling the pressure application onto the at least one adjustment actuator 8 or 12 by the pump 16 can advantageously be electrically controlled, for which purpose a control connector can be provided at the quick coupler 1 to be able to give control commands to the quick coupler 1 from the driver's cabin of the carrier unit. It would, however, generally also be possible to provide a valve arrangement that works independently of pressure so that a time-offset actuation of the adjustment actuators 8 and 12 is possible solely by the control of the pump 16. For this purpose, the pump 16 can, for example, provide different pressure levels in dependence on which the one and/or the other adjustment actuator 8 and 12 respectively is then acted on.

It is alternatively likewise possible that separate pumps 16, 24 are associated one each with one of the adjustment actuators 8 and 12 for the securing element 7 and the locking element 11 respectively so that the securing element 7 or the locking element 11 can be selectively actuated by a simple electric control of the respective pump.

FIGS. 4-11 illustrate exemplary embodiments where the electric drive 15 of the electric drive assembly 20 is attached to or integrated in the quick coupler 1 itself so that the quick coupler, including the electric drive, forms a separate independent assembly that can be attached to and dismantled from the tool operator as a whole.

As shown in FIGS. 4-11, the electric drive 15 includes the electric motor 17, the pump 16 and the tank 19, which elements form a preassembled unit. As shown particularly in FIGS. 5 and 7, the electric drive 15 can be attached to a horizontal cross plate by means of four screw bolts 32 going through the pump 16 casing.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A quick coupler for coupling a first tool of a tool operator to a second tool of the tool operator, the tool operator having a tool operator actuation system to actuate one or both of the first and second tools, the quick coupler comprising:
   a coupling mount for receiving a first locking part;
   a securing element for catching and/or securing the first locking part in the coupling mount;
   a securing element adjustment actuator for actuating the securing element;
   a locking mount for receiving a second locking part;
   a locking element for locking the second locking part in the locking mount;
   a locking element adjustment actuator for actuating the locking element; and
   an electric drive assembly for actuating the securing element adjustment actuator and the locking element adjustment actuator;
   wherein an electric drive of the electric drive assembly is attached to or integrated in the quick coupler itself so that the quick coupler, including the electric drive, forms a separate independent assembly that can be attached to and dismantled from the tool operator as a whole; and
   wherein the electronic drive assembly is configured such that the locking element and the securing element are one or both:
   actuated independently of one another; and
   actuated in a manner offset in time from one another.

2. The quick coupler of claim 1, wherein the electric drive assembly comprises:
   a securing element electric drive for actuating the securing element adjustment actuator; and
   a locking element electric drive for actuating the locking element adjustment actuator.

3. The quick coupler of claim 2, wherein the locking element electric drive is attached to or integrated in the quick coupler itself so that the quick coupler, including the locking element electric drive, forms a separate independent assembly that can be attached to and dismantled from the tool operator as a whole.

4. The quick coupler of claim 1, wherein the tool operator actuation system is a hydraulic system.

5. A quick coupler for coupling a tool to an excavator arm comprising:
- a coupling mount for receiving a first locking part;
- a locking mount for receiving a second locking part;
- a locking element for locking the second locking part in the locking mount;
- a locking element adjustment actuator for actuating the locking element;
- an electronic drive assembly for actuating the quick coupler, wherein the quick coupler is electrically controllable and actuable; and
- a locking element electric drive of the electronic drive assembly for actuating the locking element adjustment actuator;
- wherein the locking element electric drive is attached to or integrated in the quick coupler itself so that the quick coupler, including the locking element electric drive, forms a separate independent assembly that can be attached to and dismantled from the excavator arm as a whole.

6. The quick coupler of claim 5, wherein the locking element electric drive has a pump that provides pressure medium to actuate the locking element adjustment actuator configured as a pressure medium actuator.

7. A quick coupler for coupling a first tool of a tool operator to a second tool of the tool operator, the quick coupler comprising:
- a coupling mount for receiving a first locking part;
- a locking mount for receiving a second locking part;
- a locking element for locking the second locking part in the locking mount;
- a locking element adjustment actuator for actuating the locking element; and
- an electric drive assembly for actuating the locking element adjustment actuator;
- wherein an electric drive of the electric drive assembly is attached to or integrated in the quick coupler itself so that the quick coupler, including the electric drive, forms a separate independent assembly that can be attached to and dismantled from the second tool as a whole;
- wherein the tool operator has a tool operator actuation system to actuate one or both of the first and second tools; and
- wherein the electric drive assembly is configured to be separate of and independent from the tool operator actuation system.

8. The quick coupler of claim 7 being an electrically controllable and actuable quick coupler, wherein at least one of the tools of the tool operator is actuated by a hydraulic system; and
- wherein the electric drive assembly of the quick coupler is separate of and independent from the hydraulic system of the excavator.

9. The quick coupler of claim 8, wherein the tool operator is an excavator, one of the tools is an excavator arm; and
- wherein the electric drive assembly comprises a pump that provides pressure medium to actuate the locking element adjustment actuator.

10. The quick coupler of claim 9, wherein the locking element adjustment actuator comprises a dual action pressure medium cylinder having two pressure chambers; and
- wherein the pump is in flow connection to both pressure chambers of the pressure medium cylinder.

11. The quick coupler of claim 9, wherein the electric drive assembly further comprises a tank in flow connection with the pump.

12. The quick coupler of claim 8 further comprising a securing element for securing the first locking part in the coupling mount; and
- wherein the tool operator is an excavator, and one of the tools is an excavator arm.

13. The quick coupler of claim 10 further comprising a securing element adjustment actuator for actuating the securing element.

14. The quick coupler of claim 13, wherein the securing element adjustment actuator comprises a pressure medium actuator.

15. The quick coupler of claim 14, wherein the electric drive assembly comprises a pump that provides pressure medium to actuate the securing element adjustment actuator.

16. The quick coupler of claim 7 further comprising:
- a securing element for securing the first locking part in the coupling mount; and
- a securing element adjustment actuator for actuating the securing element; and
- wherein the electric drive assembly actuates both the locking element adjustment actuator and the securing element adjustment actuator.

17. The quick coupler of claim 16, wherein the electric drive assembly comprises a pump that provides pressure medium to actuate both the locking element adjustment actuator and the securing element adjustment.

18. The quick coupler of claim 16, wherein the electric drive assembly comprises a pump that provides pressure medium to actuate one of the locking element adjustment actuator and the securing element adjustment; and
- wherein a second pump provides pressure medium to actuate the other of the locking element adjustment actuator and the securing element adjustment actuator.

19. The quick coupler of claim 16, wherein the electric drive assembly is configured such that the locking element and the securing element can be actuated independently of one another.

20. The quick coupler of claim 16, wherein the electric drive assembly is configured such that the locking element and the securing element can be actuated in a manner offset in time from one another.

21. The quick coupler of claim 2, wherein the locking element electric drive is configured to be separate of and independent from the tool operator actuation system.

* * * * *